Sept. 9, 1958          A. L. GOOD          2,851,100

DEFROST CONTROL

Filed Oct. 17, 1955          5 Sheets-Sheet 1

INVENTOR.
ARTHUR L. GOOD
BY
Maurice A. Weikart
ATTORNEY

Sept. 9, 1958　　　A. L. GOOD　　　2,851,100
DEFROST CONTROL

Filed Oct. 17, 1955　　　　　　　　　　5 Sheets-Sheet 2

INVENTOR.
ARTHUR L. GOOD
BY Maurice A. Weikart
ATTORNEY

Sept. 9, 1958  A. L. GOOD  2,851,100
DEFROST CONTROL
Filed Oct. 17, 1955  5 Sheets-Sheet 3

INVENTOR.
ARTHUR L. GOOD
BY
Maurice A. Weikart
ATTORNEY

Sept. 9, 1958

A. L. GOOD 2,851,100

DEFROST CONTROL

Filed Oct. 17, 1955

INVENTOR.
ARTHUR L. GOOD
BY

Maurice A. Weikart

ATTORNEY

Sept. 9, 1958 A. L. GOOD 2,851,100
DEFROST CONTROL
Filed Oct. 17, 1955 5 Sheets-Sheet 5
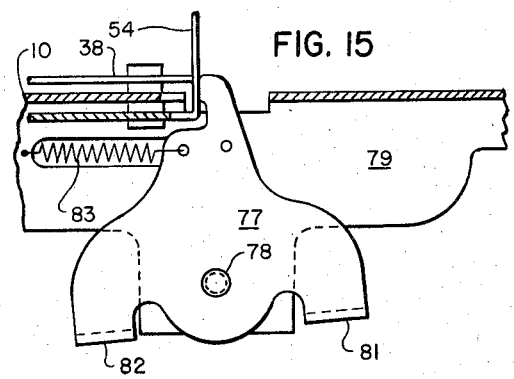
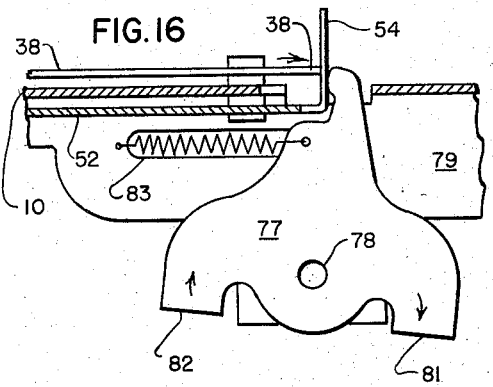
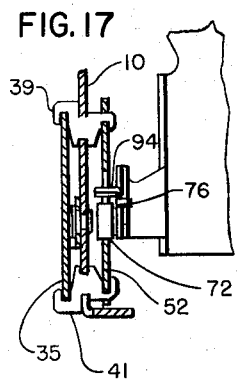
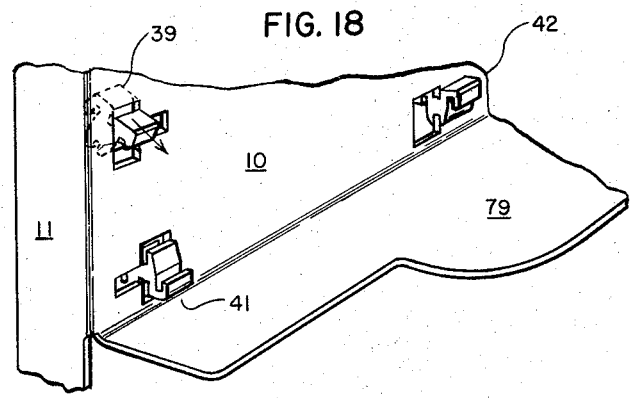
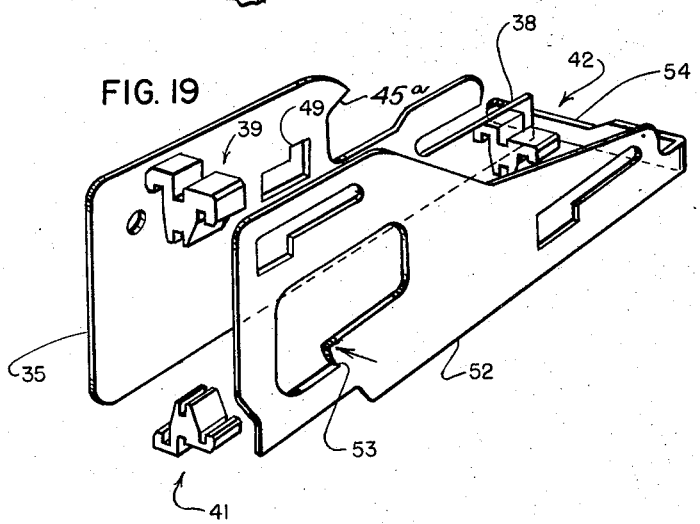
INVENTOR.
ARTHUR L. GOOD
BY
Maurice A. Weikart
ATTORNEY United States Patent Office 2,851,100
Patented Sept. 9, 1958

2,851,100

DEFROST CONTROL

Arthur L. Good, Elkhart, Ind., assignor to Penn Controls Incorporated, Goshen, Ind., a corporation of Indiana Application October 17, 1955, Serial No. 540,775

10 Claims. (Cl. 161—1)

This invention relates generally to intermittently operated switching devices and in particular to refrigeration defrost timers of the type in which a switching mechanism is actuated at timed intervals and is deactuated in response to a predetermined condition at the evaporator.

To provide for defrosting of refrigerators it is customary to open the circuit to the compressor at timed intervals; electric heating elements may be provided which can be energized during these defrost periods to melt away accumulated frost on the evaporator. These defrost periods, although initiated at timed intervals, are, customarily, terminated by an auxiliary device which may respond to the existence of frost at the evaporator, the pressure on the low side of the refrigeration system, the temperature at the evaporator, or to any condition which indicates that defrosting of the evaporator has been completed.

To prevent overheating of the refrigerator and its contents in the event that the evaporator condition responsive device should not operate and therefore fail to terminate the defrost period, a time override mechanism is often provided on the defrost timer, this mechanism serving to terminate the defrost period a timed interval after the initiation of the defrost period if the evaporator condition responsive device has not previously operated to terminate the defrost period. The flexibility and adaptability of the defrost control to various frost detection systems can obviously be greatly improved if this time override interval can be adjusted.

An object of the present invention is to provide a defrost timer control in which the time override interval is readily adjustable.

A further object is to provide a defrost timer which will accommodate a pressure responsive device, temperature responsive device, magnetic solenoid, or similar evaporator condition responsive device to terminate the defrost period.

A further object is to provide a defrost timer which will not initiate a scheduled defrost period if the evaporator condition responsive device indicates there is no need to defrost the evaporator.

A further object is to provide a control timer which possesses versatility in that it can be either enclosure mounted or panel mounted and can accommodate various types of circuit switching apparatus or other control apparatus.

A further object is to provide a defrost timer having the features heretofore mentioned and having component parts which need not be held to close tolerances and therefore are suited for mass production.

These and other objects will be made apparent by the detailed description hereafter set out and the drawings in which:

Figure 15 is a top view of a portion of the switching mechanism illustrating its deactuated position.

Figure 16 is a view similar to Figure 15 but with the parts illustrated in their actuated positions.

Figure 17 is a partial, sectional view of certain portions of the defrost timer, the section being taken generally along the line XVII—XVII of Figure 5.

Figure 18 is a partial, perspective view illustrating the assembly procedure for certain of the parts shown in Figure 17.

Figure 19 is a perspective view further illustrating the assembly of certain of the defrost timer parts.

Figure 1:
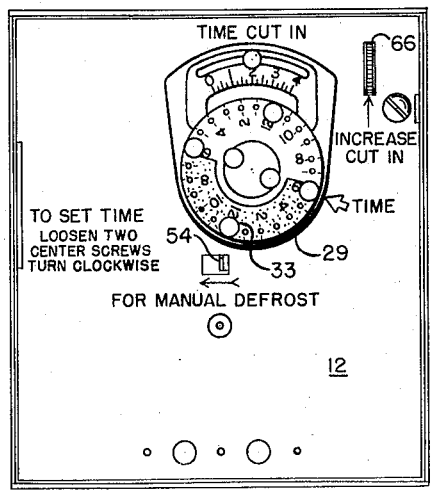
Figure 1 is a front view of a portion of the defrost timer showing the front cover plate in place.
Figure 3:
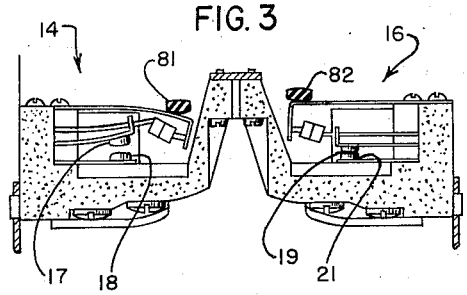
Figure 3 is a sectional view of the switch portion of the defrost timer, the section being taken generally along the line III—III of Figure 2.
Figure 2:
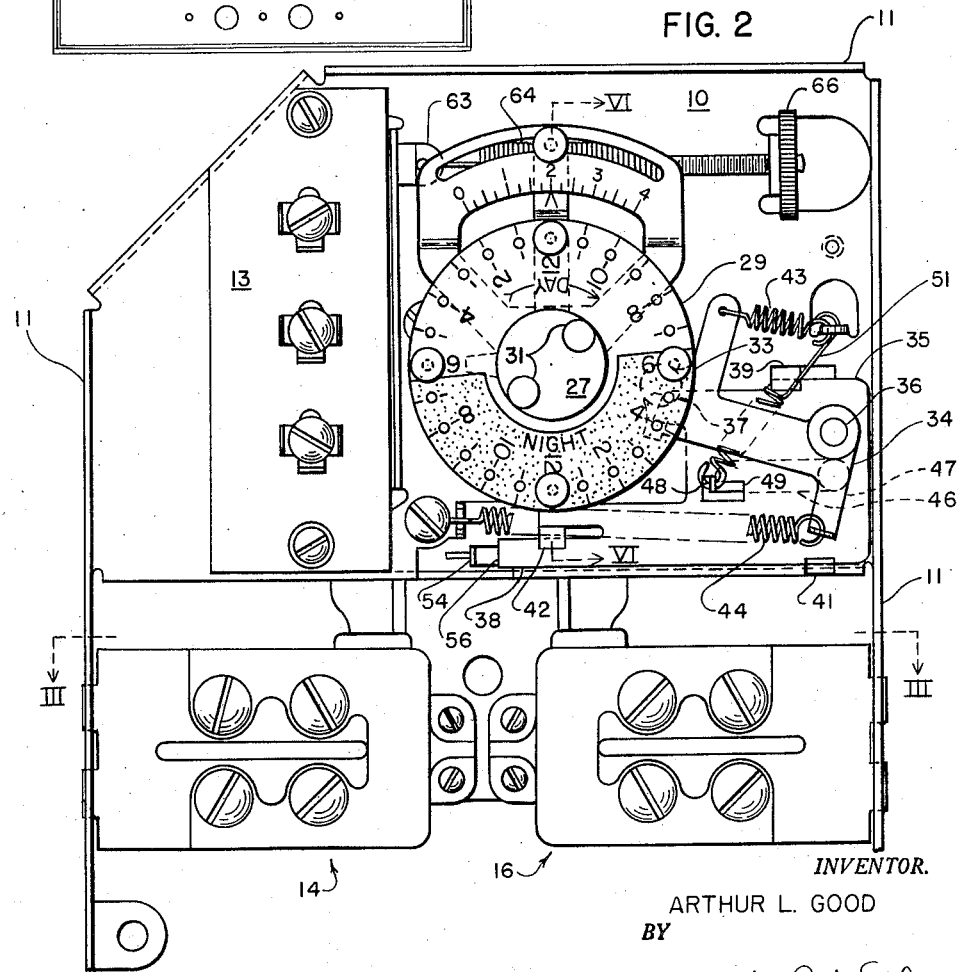
Figure 2 is a front view of the complete defrost timer with the front cover plate removed.

Referring principally to Figures 1, 2, and 3, a central mounting panel 10 is shown, having forwardly flanged marginal portions 11, over which may be fitted, and secured by any suitable means, a front cover plate 12 (Figure 1) carrying appropriate marking and instruction for making certain adjustments to the defrost timer. A terminal carrying panel 13 is mounted on the panel 10, as are two switches 14 and 16, being normally open and normally closed, respectively. The switches 14 and 16 are shown in detail in Figure 3, and have normally open contacts 17 and 18 and normally closed contacts 19 and 21. Switches 14 and 16 form no part of the present invention, and, as shown, are of the type disclosed in King Patent 2,614,395.

Figure 6:
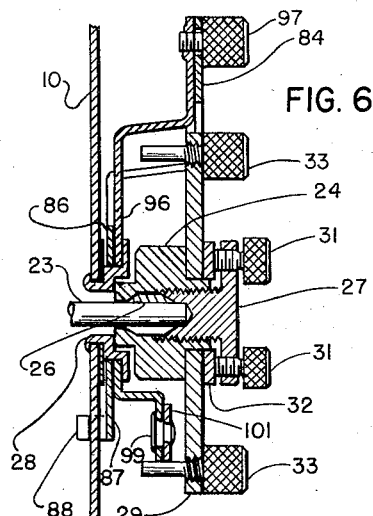
Figure 6 is a partial sectional view of the central camming portion of the defrost timer, the section being taken generally along the line VI—VI of Figure 2.
Figure 5:
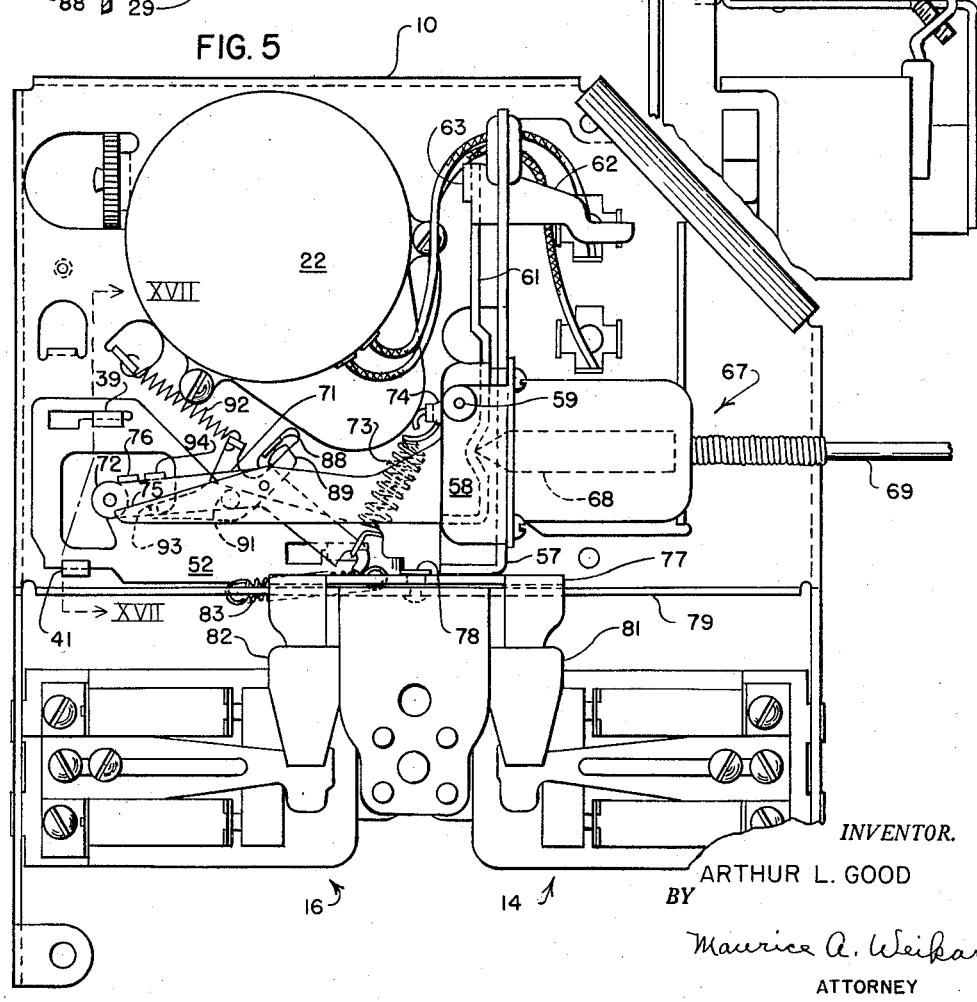
Figure 5 is a rear view of the complete defrost timer.

Referring now to Figures 5 and 6, reference numeral 22 identifies a conventional clock motor with its accompanying enclosed gear train mounted on the rear face of panel 10. The output shaft 23 (Figure 6) of motor 22 extends through panel 10 and into a dial hub 24. A compression collet 26 and a clutch screw 27, threaded into hub 24, serve to secure the hub 24 to shaft 23 for rotation of hub 24 by the shaft 23. A bushing 28 serves to appropriately locate hub 24. A dial 29 is rigidly secured to hub 24 by means of knurled screws 31 which clamp a plate 32 and dial 29 against an appropriate shoulder on the hub 24. Loosening screws 31 permits the dial 29 to be rotated or adjusted relative to hub 24.

Dial 29 adjacent its periphery carries a marginal row of threaded openings any one of which is adapted to receive a threaded camming member or abutment 33.

As disclosed herein the dial 29 is provided with four of the camming members 33. Adapted to be engaged by member 33 is a release member or arm 34 pivotally mounted on an actuating member or cocking slide 35 by means of the pin 36 (Figure 2). The free end of arm 34 underlies dial 29 and carries a roller 37 which is free to rotate relative to arm 34 and is adapted to be engaged by the shank portion of the members 33. The cocking slide 35 is generally L-shaped, having an extending leg 38, and is free to slide horizontally relative to panel 10 in a path established by slide mounting member 39, 41, and 42, as may be seen in Figures 2, 18, and 19. A return biasing means in the form of a tension spring 43 (Figure 2) extending between panel 10 and an elongated portion of arm 34 serves to hold arm 34 in its furthermost clockwise position, as viewed in Figure 2. A cocking spring 44, also a tension spring, extends between an appropriate ear on the plate 10 and a depending portion of the arm 34. A rearwardly extending tab 45 (Figure 10) on arm 34, adapted to contact the surface 45a (Figure 19) on slide 35 serves to limit clockwise rotation (as viewed in Figure 10) of arm 34 relative to slide 35.

A trip member or latch member 46 (Figure 2), pivotally mounted on panel 10 by means of pin 47, has a forwardly extending ear 48 which extends through an L-shaped slot 49 in the slide 35. A tension spring 51 urges latch member 46 into its furthermost clockwise position (as viewed in Figure 2) and into the upper portion of slot 49. Slide 35 is held against the leftward force exerted by tensioning spring 44 (as viewed in Figure 2) by means of the latching engagement of ear 48 in the upper portion of slot 49.

Referring now principally to Figure 5, an actuated slide 52 is mounted on the rear face of panel 10 and is adapted to move horizontally relative thereto in a path established by appropriate grooves in members 39, 41, and 42. A central cut-out portion of slide 52 establishes a detent or dwell portion 53 and, as may best be seen in Figure 19, one end of slide 52 carries a finger 54 which extends through the panel 10 and is adapted to contact the corresponding extending leg 38 of the slide 35.

Figure 4:
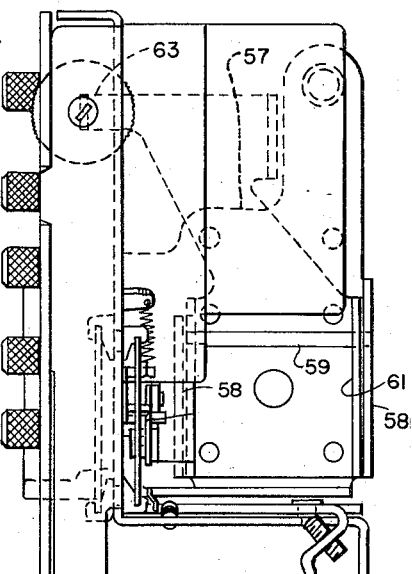
Figure 4 is a side view of the defrost timer.

Referring again to Figures 4 and 5, a mounting plate 57 is rigidly secured to the rear face of panel 10 and has two flanged edges 58 which serve as bearing surfaces for a pin 59 (Figure 4). Carried by the pin 59 is a bell crank 61 having at its upper end (as viewed in Figure 5) a sidewardly extending arm 62 and a rearwardly extending tab 63. Tab 63 extends through an appropriate opening in panel 10 and, as may be seen best in Figure 2, carries a loading spring 64, the tension of which may be adjusted by rotation of the knurled hand wheel 66 which, with its threaded shank and spring retainer are suitably mounted on the front of the panel 10. As may best be seen in Figure 5, mounting plate 57 carries an evaporator condition responsive device 67, which may take the form of temperature or pressure responsive member adapted to displace its thrust pin 68 in response to a change in pressure or temperature at a location remote from the timer, the change in condition being sensed by the customary bulb, not shown, which communicates to the device 67 by means of capillary tube 69. The device 67 may, as previously pointed out, be an element sensitive to the pressure in the low side of the refrigeration system or may be a solenoid operator actuated by a remote switch such as a thermostat.

Centrally on the horizontal portion of the bell crank 61 is pivotally mounted a latch member or locking arm 71 carrying at one of its free ends a roller 72 and at its other end carrying a tension spring 73 which is anchored on a tab 74 extending from bell crank 61 at a point just below (as viewed in Figure 5) its pivot 59. A forwardly extending tab 76, forming an integral part of arm 71, is adapted to be engaged, on its underside, by the free end 75 of the horizontal portion of the bell crank 61.

As may best be seen in Figures 5, 15 and 16 a switch actuator 77, pivotally mounted at 78 on an extending flanged portion 79 of the panel 10, has downwardly extending switch actuating arms 81 and 82 which cooperate with the movable portions of switches 14 and 16, respectively. A tension spring 83 anchored on flange 79, serves to bias actuator 77 into the position shown in Figure 15, in which position switches 14 and 16 are open and closed, respectively, as shown in Figure 3.

Figure 10:
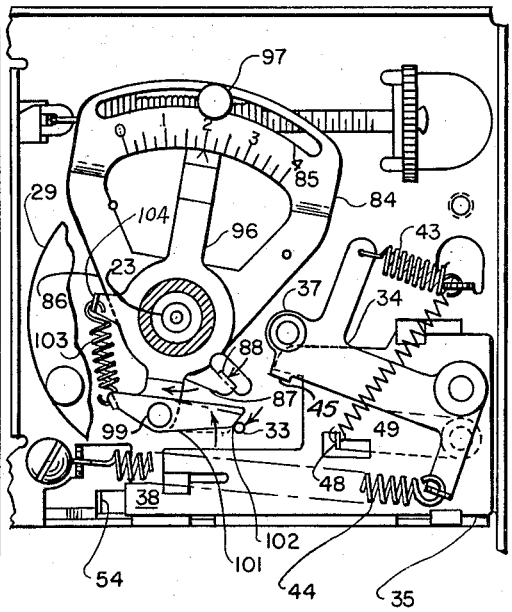
Figure 10 is a view similar to Figure 9 but illustrating further progression of the camming action.
Figure 14:
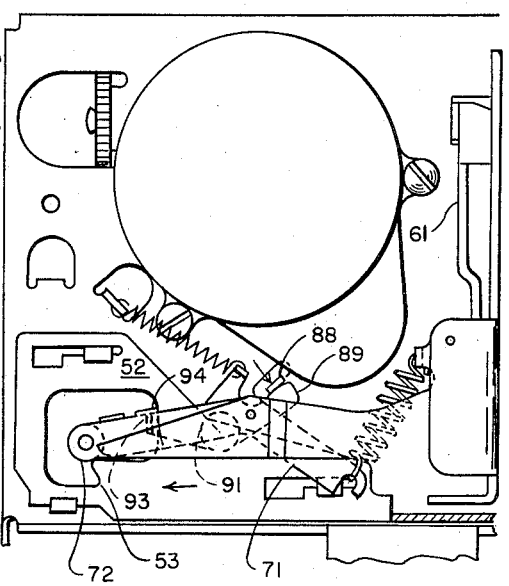
Figure 14 is a view similar to Figure 13 but illustrates the parts in their positions assumed as the defrost period is terminated by the timer override mechanism.

The time override mechanism, now to be described, is shown in profile in Figure 6 and frontally in Figure 10. Referring to Figures 6 and 10, there is shown a member 84 having an upper arcuate slotted portion 85, carrying suitable adjustment marking, and depending legs terminating in a mounting hub 86, which is free to rotate on the bushing 28. An arm 87 integral with and extending from the member 84 has a tab 88 which extends through an appropriate opening in the panel 10. As may best be seen in Figure 5, tab 88 is adapted to cooperate with one end of a trip member 89, pivotally mounted at 91 to the rear face of the panel 10. A tension spring 92 biases member 89 into its extreme counterclockwise position (as viewed in Figure 5). The other end of a trip member 89 carries a tab 93 adapted to cooperate with a corresponding tab 94 integral with and extending from the upper margin of arm 71. Referring again to Figures 6 and 10, the hub 28 also carries an adjusting arm 96, which is free to rotate relative to hub 28, and carries at its offset, upper end a clamping screw 97. Screw 97 extends through the arcuate slot 85 in member 84 and serves to clamp arm 96 with reference to member 84. The relative position of arm 96 with reference to member 84 is therefore, adjustable within the range provided by the arcuate slot 85. A downwardly extending portion of arm 96 carries a pin 99 upon which is pivotally mounted a cam member 101 having a camming surface 102 (Figure 10). A tension spring 103, anchored to a tab 104 extending from arm 96 serves to bias the member 101 in its extreme clockwise position (as viewed in Figure 10), this position being established by a stop (not shown) integral with the downwardly extending portion of arm 96 which carries the pivot pin 99. Cam surface 102 is adapted to be contacted by the camming member 33, the motion thereby imparted by member 33 being delivered to trip member 89 through arm 96 and tab 88, as may best be seen in Figures 10 and 14.

*Operation*

Figure 7:
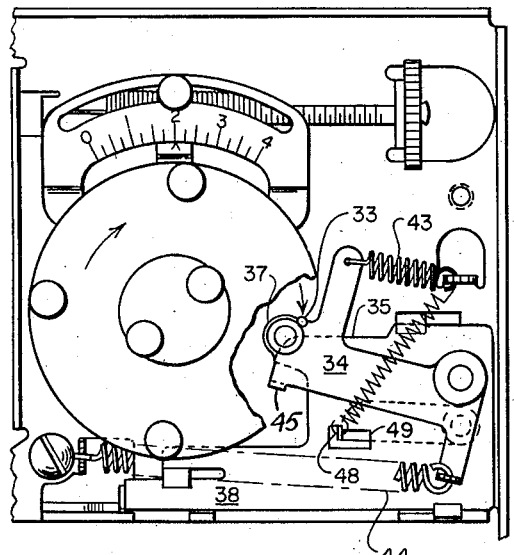
Figure 7 is a front view of the defrost timer with a portion broken away to better illustrate the position of the parts at the start of the camming action.

With the parts in the position shown in Figure 2, the switches will be in the positions shown in Figure 3, i. e., switch 14, which may control the circuit to a frost removal device such as a heater for the evaporator, will be open, and switch 16, which controls the compressor circuit will be closed. The dial 29 will revolve slowly in clockwise direction, as viewed in Figure 2. As may best be seen in Figure 7, as dial 29 rotates, camming member 33 contacts the roller 37, and upon further rotation, moves the arm 34 downwardly, tensioning the spring 44 which, before arm 34 is moved, is in an unstressed condition. This position of slide 35 and arm 34, i. e., their position before member 33 contacts roller 37, is illustrated in Figure 10 in which tab 45 of arm 34 is in contact with slide 35, limiting the clockwise pivotal motion of arm 34, and spring 44 is unstressed. During this time the slide 35 is prevented from moving to the left and relieving spring 44 because of the engagement of tab 48 in the opening 49.

Figure 8:
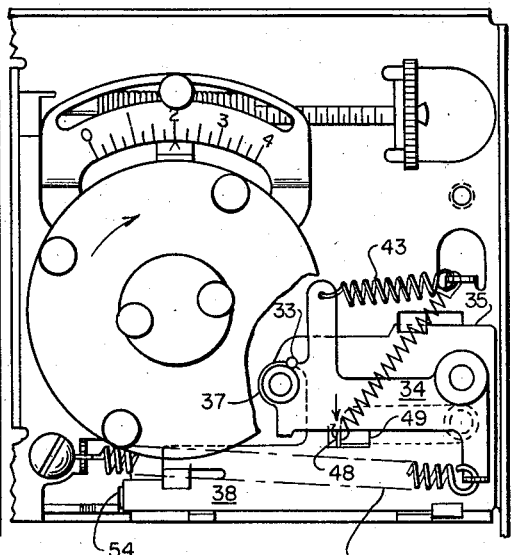
Figure 8 is a view similar to Figure 7 but illustrating the position of the parts have assumed as the camming action progresses.
Figure 9:
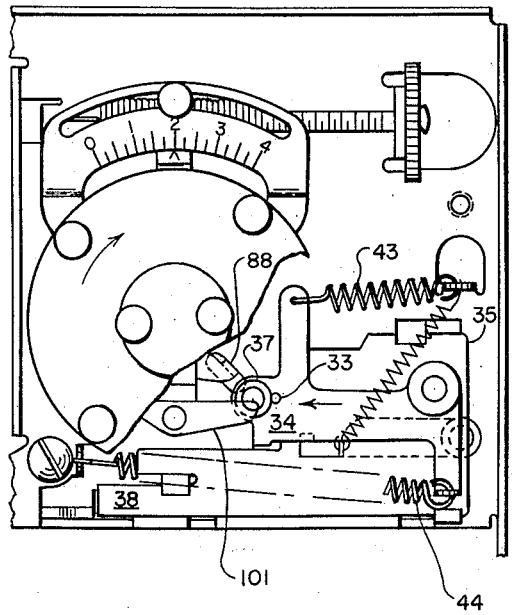
Figure 9 is a view similar to Figure 8 but illustrating further progression of the camming action.

As arm 34 is moved downwardly a position is reached (Figure 8) at which the arm 34 forces the tab 48 out of latching engagement with slide 35 and into the lower, elongated portion of the opening 49. Spring 44 thereupon immediately snaps slide 35 to the left, as viewed in Figure 9; arm 34 and roller 37 are carried to the left around the camming member 33. Because the downward force applied by member 33 is applied to roller 37 at a point to the right (as viewed in Figures 7–9) of the rotational axis of roller 37, when tab 48 releases slide 35, its leftward motion is unimpeded by member 33. After roller 37 clears the member 33, spring 43 pulls arm 34, and consequently because of the re-engagement of tab 45 with slide 35 moves slide 35 back into their positions shown in Figure 10, with tab 48 again in latching position in the opening 49, and spring 44 returned to its unstressed position. It will be apparent that in the operation, shown in sequence in Figures 8, 9, and 10, slide 35 has been snapped sharply to the left and returned and latched, by tab 48, into its original position.

As illustrated in Figures 15 and 16, the sharp movement of slide 35 referred to in the preceding paragraph, causes the portion 38 of slide 35 to strike the finger 54, which is a part of the slide 52, and, through finger 54, the extending, adjacent portion of switch actuator 77. Slide 52 and actuator 77 are thereupon moved sharply to their positions illustrated in Figure 16. The corresponding movement of parts 81 and 82, as may be seen in Figure 3, cause the compressor switch 16 to be opened and the auxiliary switch 14 to be closed.

Figure 11:
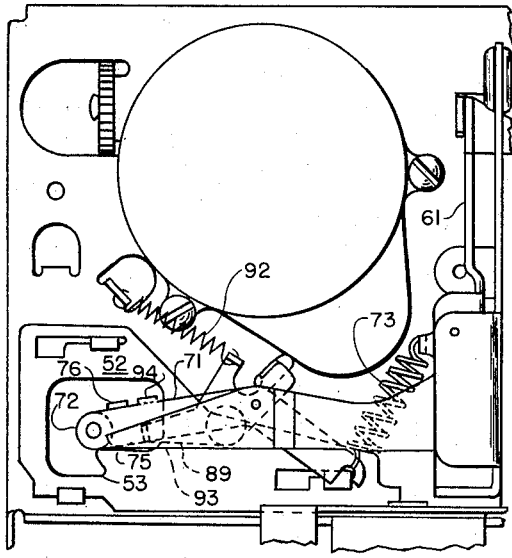
Figure 11 is a rear view of the defrost timer with the component parts in a position corresponding to the camming progression illustrated in Figures 7 and 8.
Figure 12:
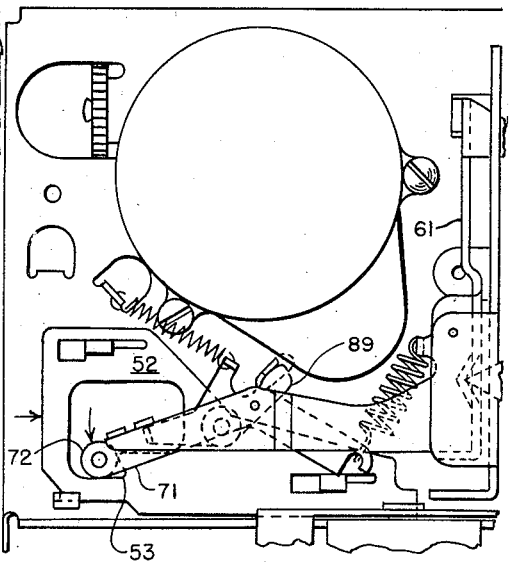
Figure 12 is a view similar to Figure 11 but with the parts in the position assumed just subsequent to the camming progression illustrated in Figure 9.

The immediate return of slide 35 to its original position, previously described does not enable slide 52 and switch actuator 77 to also immediately return to their deactuated positions because the slide 52 is latched and held in its Figure 16 positions as will now be explained with reference to Figures 11 and 12. With the parts in their deactuated position, as shown in Figure 11, the slide 52 is in its furthermost left hand position and the roller 72 rests at a point on slide 52 just above the detent 53. Upon movement of slide 52 to the right (the position shown in Figure 12) by slide 35, the roller 72 rides into the detent 53 and holds slide 52 against movement back to its deactuated (Figure 11) position against the force exerted by spring 83. With slide 52 held in its Figure 12 position, switches 14 and 16, as previously pointed out, will be held in their closed and open positions respectively. Under these conditions defrosting will take place and this defrost period will continue until it is terminated in one of two ways, i. e., either by the evaporator condition responsive device 67 or by operation of the time overide mechanism.

Figure 13:
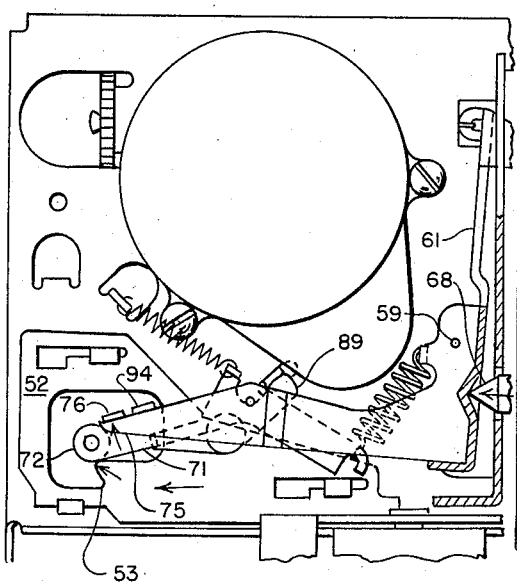
Figure 13 is a view similar to Figure 12 but illustrates the parts in their positions assumed as the defrost period is terminated by the evaporator condition responsive device.

Assuming that before dial 29 and member 33 have been rotated to their position shown in Figure 10 the evaporator has been cleared of ice and frost, the device 67 will respond by displacing its thrust pin 68 to the left, as viewed in Figure 13. This will rotate bell crank 61 clockwise about its pivot 59 causing its free end 75 to engage the underface of the tab 76, thereby lifting arm 71 and roller 72 out of detent 53 and permitting spring 83 to return member 77 and slide 52 back to their deactuated position, thus reclosing compressor switch 16 and reopening auxiliary switch 14, thereby terminating the defrost period.

It will be understood that an actuator, in lieu of device 67, such as a solenoid or other magnetic operator can be appropriately mounted to rotate bell-crank 61 for terminating the defrost period.

In the event that the device 67 should malfunction or otherwise fail to terminate the defrost period within a predetermined interval, the time override mechanism, as best illustrated in Figure 10, will terminate the defrost period an adjustable, predetermined time after initiation of the period. Referring to Figure 10, member 33 moved by dial 29, will eventually contact the oblique surface 102 of member 101 and will displace arm 96 and member 84 slightly clockwise about their pivot 23, from their position shown in Figure 9 to their position of Figure 10. As indicated in Figure 10, the tab 88, carried by member 84, will correspondingly be moved into its position of Figure 10. This movement of tab 88, as may be seen in Figure 14, will move trip member 89 about its pivot 91, causing tab 93 to contact the underface of tab 94 thereby lifting arm 71 and roller 72 out of the detent 53 and releasing slide 52 for movement back to its deactuated position permitting switches 14 and 16 to return to their open and closed positions, respectively. It will be noted that this unlatching of slide 52 by the time override mechanism is independent of the position of the thrust pin 68 and consequently independent of evaporator condition responsive device 67. As illustrated best in Figure 10, adjustment of this time override interval can be made by loosening screw 97, and changing the relative position of arm 96 and member 84, thereby altering the position on the path of movement of member 33 at which it picks up the cam member 101.

As may be seen in Figure 1, the defrost period may be manually initiated by moving finger 54 to the left. This movement, as illustrated in Figure 16 carries member 77 to a position in which switches 14 and 16 are closed and opened respectively, and slide 52 is latched in actuated position by roller 72, as previously explained. The defrost period thus manually initiated will be terminated, as pointed out with respect to a time-initiated defrost period, either by the time override mechanism or by response of the device 67.

In the event that a defrost period is initiated by the cam member 33 at a time when the thrust pin 68 of the condition responsive device 67 is extended, the parts will of course be in their position shown in Figure 13. Slide 35 will be snapped to its Figure 9 position, as previously explained and immediately returned to its Figure 10 position. However, as may be seen in Figure 13, since the end 75 of bell crank 61 will hold (by means of tab 76) the roller 72 out of the detent 53, slide 52 will not be latched in its furthermost right hand position but will immediately return to its deactuated position. Consequently switches 14 and 16 will only momentarily be moved to their actuated positions and will immediately be returned to their deactuated (Figure 3) positions. From the foregoing it will be apparent that a defrost period cannot be initiated if the condition responsive member 67 indicates that a defrost period is unnecessary.

Figures 18 and 19 are illustrative of the assembly procedure for the slides 35 and 52 on the panel 10 by means of members 39, 41, and 42. With members 41 and 42 in place on panel 10, slides 35 and 52 may be placed in the proper grooved portions of members 41 and 42. As may be seen in Figure 18, member 39 may then be angled into place vertically, then slid to the right (as viewed in Figure 18) into position.

From the foregoing it will be apparent that there is herein described a defrost timer performing the several required functions, having an adjustable time override interval and being made up of parts which need not be held to extremely close tolerances and therefore lend themselves to mass production.

Alterations may be made in the disclosure presented above without departing from the scope of the invention which is to be limited only by the appended claims.

What is claimed is:

1. A time switch mechanism of the type in which an electrical control means is operated by an actuated member comprising: timing means including an abutment driven at a uniform speed through a predetermined path, an actuating member capable of a limited rectilinear displacement, a trip member adapted to retain said actuating member in undisplaced position, an actuated member capable of limited displacement and adapted to be so displaced by said actuating member upon the displacement thereof, biasing means for biasing said actuated member into its undisplaced position and a latch member adapted to retain said actuated member in displaced position against the force exerted by said biasing means, energy storage means including resilient means and a release member carried by said actuating member and moved by said abutment against the force exerted by said resilient means to provide energy for sharply displacing said actuating member upon energy release, said release member being adapted to release the energy thereby stored in said resilient means at one terminal of its movement by actuating said trip member to permit the displacement of said actuating member.

2. A time switch mechanism of the type in which an electrical control means is operated by an actuated member comprising: timing means including an abutment driven at a uniform speed through a predetermined path, an actuating member capable of a limited rectilinear displacement, a trip member adapted to retain said actuating member in undisplaced position, an actuated member capable of limited displacement and adapted to be so displaced by said actuating member upon the displacement thereof, biasing means for biasing said actuated member into its undisplaced position and a latch member adapted to retain said actuated member in displaced position against the force exerted by said biasing means, energy storage means including resilient means and a release member pivotally mounted on said actuating member and adapted to be pivotally moved by said abutment against the force exerted by said resilient means to provide energy for sharply displacing said actuating member upon energy release, said release member being adapted to release the energy thereby stored in said resilient means at one terminal of its movement by actuating said trip member to permit the displacement of said actuating member, and return biasing means adapted to act through said release member to return said actuating member to its undisplaced position.

3. A time switch mechanism of the type in which an electrical control means is operated by an actuated member comprising: timing means including an abutment driven at a uniform speed through a predetermined path, an actuating member capable of a limited rectilinear displacement, a trip member adapted to retain said actuating member in undisplaced position, an actuated member capable of limited displacement and adapted to be so displaced by said actuating member upon the displacement thereof, biasing means for biasing said actuated member into its undisplaced position and a latch member adapted to retain said actuated member in displaced position against the force exerted by said biasing means, energy storage means including resilient means and a release member carried by said actuating member and moved by said abutment against the force exerted by said resilient means to provide energy for sharply displacing said actuating member upon energy release, said release member being adapted to release the energy thereby stored in said resilient means at one terminal of its movement by actuating said trip member to permit the displacement of said actuating member, and a time override member engaged by said abutment a time interval subsequent to movement of said release member by said abutment, said time override member being adapted to unlatch said latch member thereby restoring said actuated member to its undisplaced position.

4. A time switch mechanism of the type in which an electrical control means is operated by an actuated member comprising: timing means including an abutment driven at a uniform speed through a predetermined path, an actuating member capable of a limited rectilinear displacement, a trip member adapted to retain said actuating member in undisplaced position, an actuated member capable of limited displacement and adapted to be so displaced by said actuating member upon the displacement thereof, biasing means for biasing said actuated member into its undisplaced position and a latch member adapted to retain said actuated member in displaced position against the force exerted by said biasing means, energy storage means including resilient means and a release member carried by said actuating member and moved by said abutment against the force exerted by said resilient means to provide energy for sharply displacing said actuating member upon energy release, said release member being adapted to release the energy thereby stored in said resilient means at one terminal of its movement by actuating said trip member to permit the displacement of said actuating member, a time override member engaged by said abutment a time interval subsequent to movement of said release member by said abutment, said time override member being adapted to unlatch said latch member thereby restoring said actuated member to its undisplaced position, and manual means for moving said actuated member to its displaced position independently of said actuating member.

5. A time switch mechanism of the type in which an electrical control means is operated by an actuated member comprising: timing means including an abutment driven at a uniform speed through a predetermined path, an actuating member capable of a limited rectilinear displacement, a trip member adapted to retain said actuating member in undisplaced position, an actuated member capable of limited displacement and adapted to be so displaced by said actuating member upon the displacement thereof, biasing means for biasing said actuated member into its undisplaced position and a latch member adapted to retain said actuated member in displaced position against the force exerted by said biasing means, energy storage means including resilient means and a release member carried by said actuating member and moved by said abutment against the force exerted by said resilient means to provide energy for sharply displacing said actuating member upon energy release, said release member being adapted to release the energy thereby stored in said resilient means at one terminal of its movement by actuating said trip member to permit the displacement of said actuating member, and a time override member engaged by said abutment a time interval subsequent to movement of said release member by said abutment, said time override member being adapted to unlatch said latch member thereby restoring said actuated member to its undisplaced position, adjustment means for adjusting the relative position of said time override member and said release thereby varying the length of said time interval.

6. A time switch mechanism of the type in which an electrical control means is operated by an actuated member comprising: timing means including an abutment driven at a uniform speed through a predetermined path, an actuating member capable of a limited rectilinear displacement, a trip member adapted to retain said actuating member in undisplaced position, an actuated member capable of limited displacement and adapted to be so displaced by said actuating member upon the displacement thereof, biasing means for biasing said actuated member into its undisplaced position and a latch member adapted to retain said actuated member in displaced position against the force exerted by said biasing means, energy storage means including resilient means and a release member carried by said actuating member and moved by said abutment against the force exerted by said resilient means to provide energy for sharply displacing said actuating member upon energy release, said release member being adapted to release the energy thereby stored in said resilient means at one terminal of its movement by actuating said trip member to permit the displacement of said actuating member, an unlatching member moveable to unlatch said latch member thereby releasing said actuated member to return to its undisplaced position, and a condition responsive device adapted to move said unlatching member.

7. A time switch mechanism of the type in which an electrical control means is operated by an actuated member comprising: timing means including an abutment driven at a uniform speed through a predetermined path, an actuating member capable of a limited rectilinear displacement, a trip member adapted to retain said actuating member in undisplaced position, an actuated member capable of limited displacement and adapted to be so displaced by said actuating member upon the displacement thereof, biasing means for biasing said actuated member into its undisplaced position and a latch member adapted to retain said actuated member in displaced position against the force exerted by said biasing means, energy storage means including resilient means and a release member carried by said actuating member and moved by said abutment against the force exerted by said resilient means to provide energy for sharply displacing said actuating member upon energy release, said release member being adapted to release the energy thereby stored in said resilient means at one terminal of its movement by actuating said trip member to permit the displacement of said actuating member, an unlatching member moveable to unlatch said latch member thereby releasing said actuated member to return to its undisplaced position, and a condition responsive member adapted to move said unlatching member upon the existance of a predetermined condition value and means for manually adjusting said predetermined condition value.

8. In a timing mechanism, an actuating member moveable rectilinearly between a first position and a second position, control means actuated upon movement of said actuating member into its second position, means for moving said actuating member sharply from its said first position into its said second position, a trip member adapted to retain said actuating member in its said first position, energy storage means including resilient means and a release member carried by said actuating member and moveable against the force exerted by said biasing means to provide energy for displacing said actuating member from its said first position to its second position, said release member carrying a roller member, means for moving said release member including an abutment driven at a uniform speed through an arcuate path and adapted to apply a tangential force to said roller at a point on said roller laterally displaced from the center thereof thereby permitting said actuating member to be moved rectilinearly in a direction generally normal to the direction of said tangential force, and means for releasing said trip member.

9. In a timing mechanism, an actuating member moveable rectilinearly between a first position and a second position, control means actuated upon movement of said actuating member into its second position, means for moving said actuating member sharply from its said first position into its said second position, a trip member adapted to retain said actuating member in its said first position, energy storage means including resilient means and a release member carried by said actuating member and moveable against the force exerted by said biasing means to provide energy for displacing said actuating member from its said first position to its second position, said release member carrying a roller member, means for moving said release member including an abutment driven at a uniform speed through an arcuate path and adapted to apply a tangential force to said roller at a point on said roller laterally displaced from the center thereof thereby permitting said actuating member to be moved rectilinearly in a direction generally normal to the direction of said tangential force, said release member actuating said trip member at a point in its movement to release said actuated member for rectilinear movement from its first position to its second position.

10. A time switch mechanism of the type in which an electrical control means is operated by an actuated member comprising: a central mounting panel having a front face and a rear face, timing means including a camming member driven at a uniform speed in a circular path whose plane overlies the front face of said panel, an actuating member mounted on the front face of said panel and capable of limited rectilinear displacement, a trip member adapted to retain said actuating member in undisplaced position, an actuated member mounted on the rear face of said panel and capable of limited displacement and adapted to be so displaced by said actuating member upon the displacement thereof, biasing means for biasing said actuated means into its undisplaced position and a latch member adapted to retain said actuated member in displaced position against the force exerted by said biasing means, energy storage means including resilient means and a release member pivotally mounted on said actuating member and adapted to be moved by said camming member against the force exerted by said resilient means to provide energy for sharply displacing said actuating member on energy release, said release member being adapted to release said stored energy at one terminal of its movement by actuating said trip member to permit the displacement of said actuating member.

References Cited in the file of this patent
UNITED STATES PATENTS

| | | |
|---|---|---|
| 2,543,133 | Smith | Feb. 27, 1951 |
| 2,583,661 | Morrison | Jan. 29, 1952 |
| 2,711,456 | Goodhouse et al. | June 21, 1955 |